(12) United States Patent
Steele

(10) Patent No.: US 6,502,865 B1
(45) Date of Patent: Jan. 7, 2003

(54) PIPE COUPLER AND METHOD OF COUPLING

(75) Inventor: James R. Steele, Stillwater, MN (US)

(73) Assignee: Dynamic Air ( * ) Notice: Subject to any disclaimer, the term of this patent is extended or adjusted under 35 U.S.C. 154(b) by 42 days.

(21) Appl. No.: 09/635,284

(22) Filed: Aug. 9, 2000

(51) Int. Cl.⁷ .................. F16L 13/04; F16L 35/00; F16L 55/00
(52) U.S. Cl. .................................................. 285/112
(58) Field of Search ............................ 285/110, 111, 285/112, 104, 105, 337, 419, 373, 367

(56) References Cited

U.S. PATENT DOCUMENTS

| | | | |
|---|---|---|---|
| 4,461,498 A | 7/1984 | Kunsman | |
| 4,471,979 A | 9/1984 | Gibb | |
| 4,522,434 A | 6/1985 | Webb | |
| 4,561,678 A | 12/1985 | Kunsman | |
| 4,611,839 A | 9/1986 | Rung | |
| 4,702,499 A | 10/1987 | deRaymond | |
| 4,838,582 A | 6/1989 | Hatakeyama | |
| 4,886,304 A | 12/1989 | Kunsman | |
| 5,273,322 A | * 12/1993 | Straub | 285/112 |
| 5,310,223 A | * 5/1994 | Straub | 285/112 |
| 5,476,292 A | 12/1995 | Harper | |
| 5,758,909 A | 6/1998 | Dole | |
| 5,813,705 A | 9/1998 | Dole | |
| 5,911,446 A | * 6/1999 | McLennan et al. | 285/104 |
| 6,170,884 B1 | * 1/2001 | McLennan et al. | 285/112 |
| 6,273,475 B1 | * 8/2001 | Ilesic | 285/105 |

* cited by examiner

Primary Examiner—Lynne H. Browne
Assistant Examiner—Aaron M Dunwoody
(74) Attorney, Agent, or Firm—Jacobson & Johnson

(57) ABSTRACT

A method of connecting pipes in a fluid-tight end-to-end relationship and a universal pipe coupler that maintain the pipe ends proximate one another as the coupler simultaneously aligns the ends of the pipes and draws the pipes into a fluid tight sealing relationship with the universal pipe coupler colorable with frictional engaging collars or fixedly engaging collars to hold the pipe in position.

26 Claims, 8 Drawing Sheets

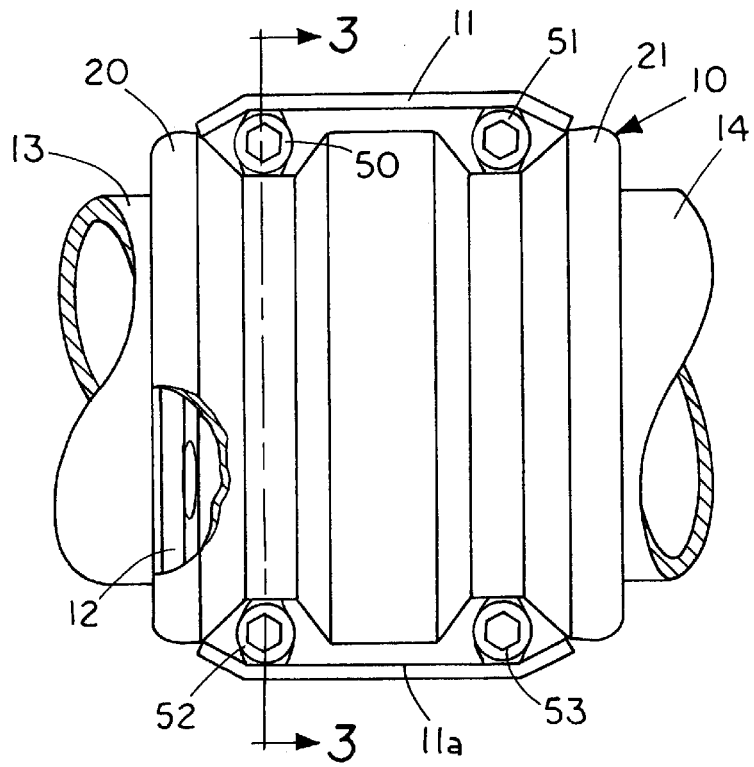
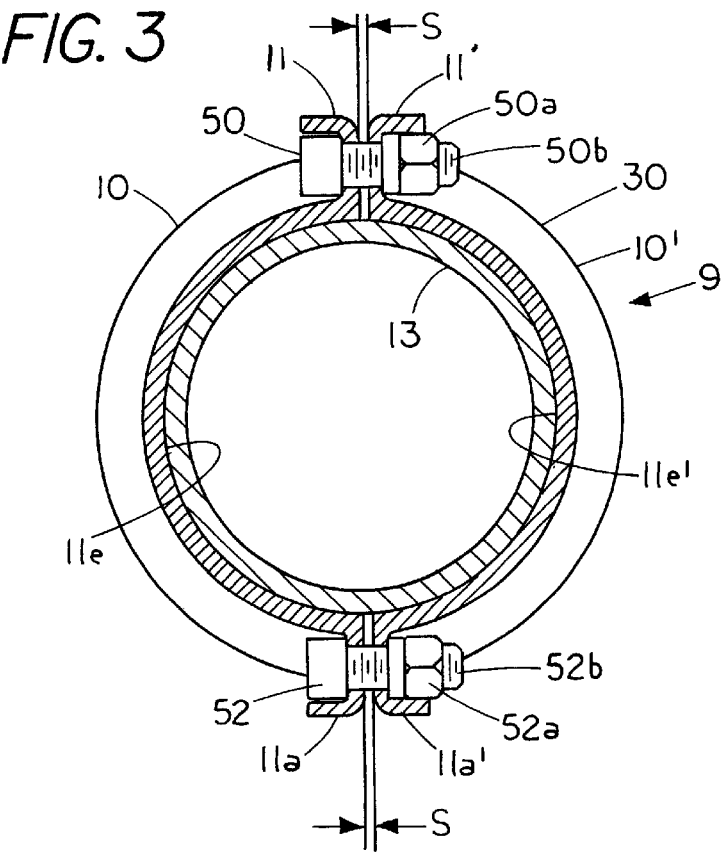

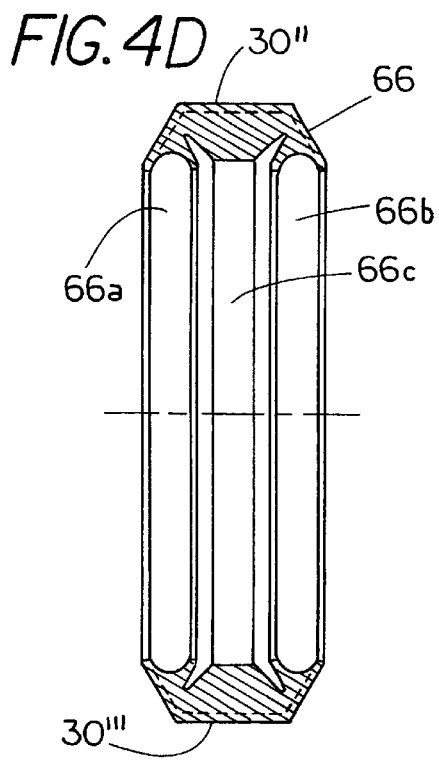
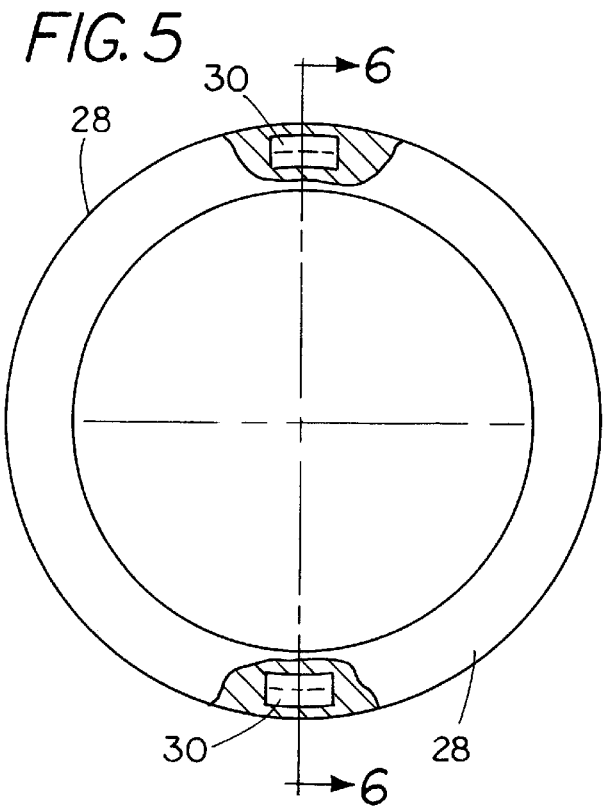
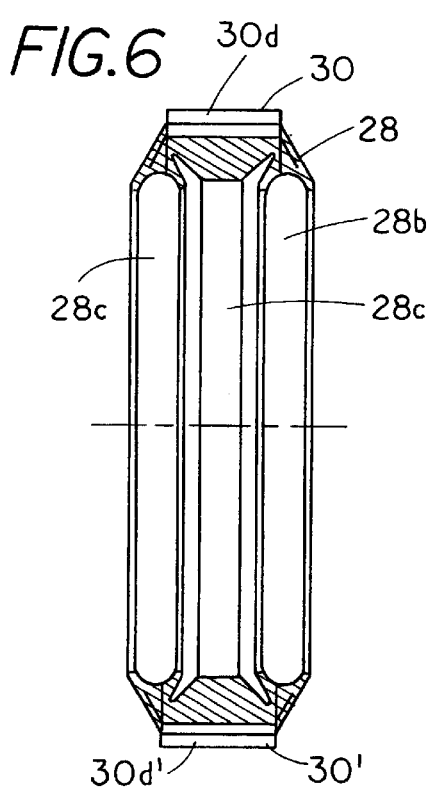
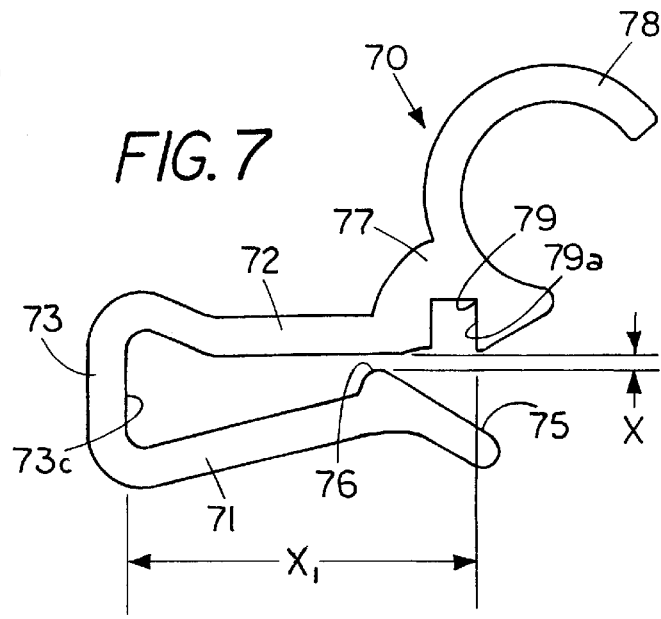

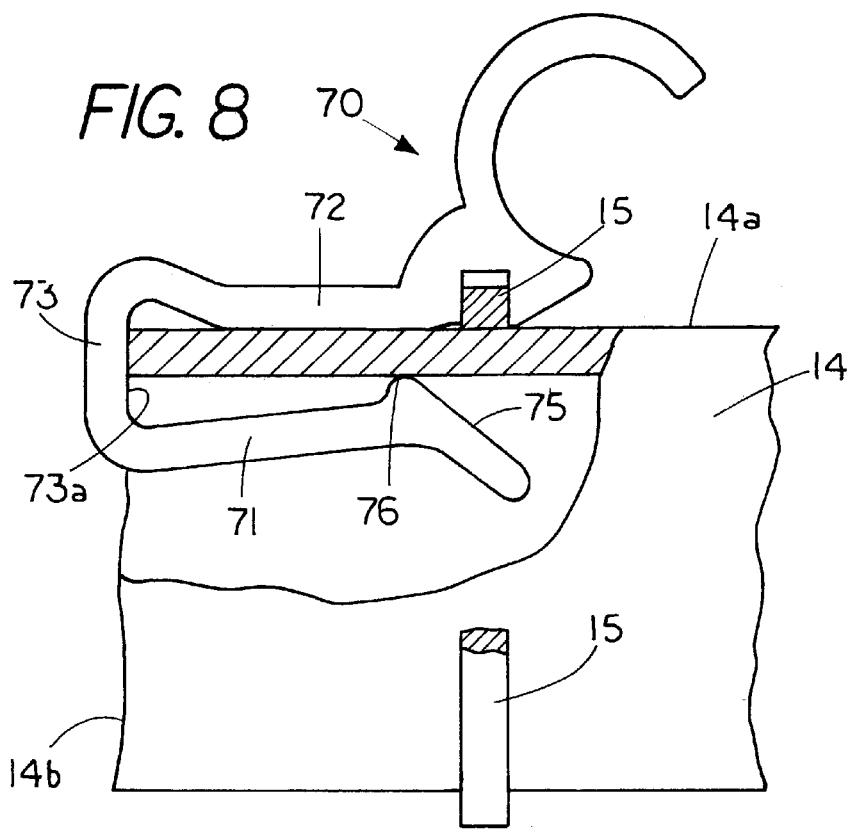
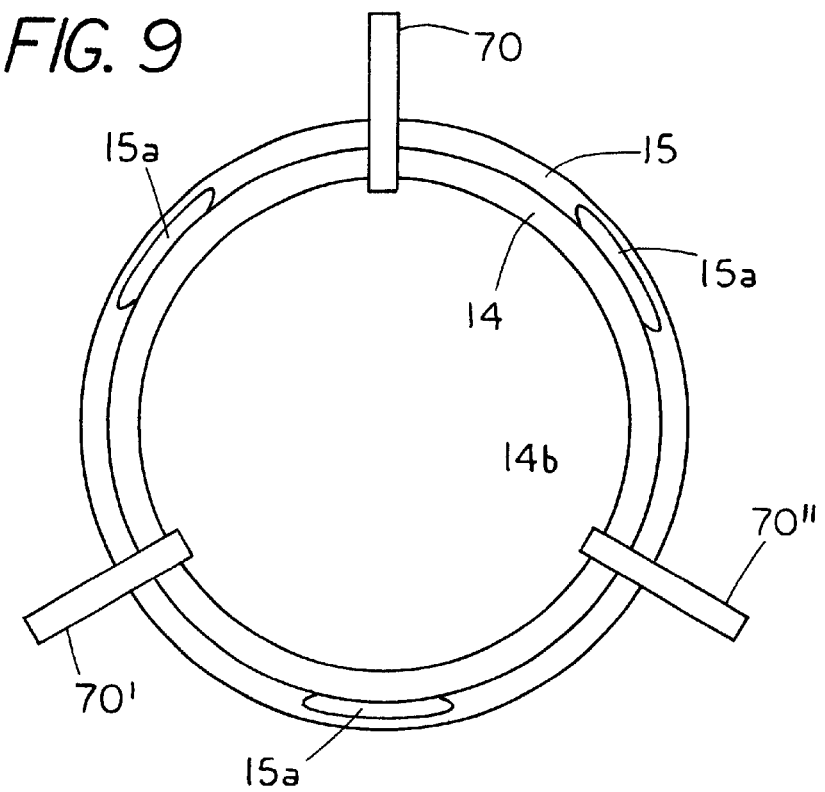

PIPE COUPLER AND METHOD OF COUPLING

FIELD OF THE INVENTION

This invention relates generally to pipe couplers and, more specifically, to a universal pipe coupler and a method of forming a fluid-tight pressure seal with pipes under either high or low pressure or pipes that are made of different materials.

BACKGROUND OF THE INVENTION

Pipe couplers are known in the art and generally comprise members that are fastened to the ends of two pipes to hold the two pipes in an end-to-end relationship. One type of pipe coupler uses members with teeth to bitingly engage the exterior of the pipe, the members are then pulled toward each other to hold the pipes in an end-to-end relationship. Another type of coupler requires forming an annular groove near the end of each pipe and then placing a flanged member into the groove. The flanged members are then pulled together to bring the pipes into an end-to-end relationship. Generally, the ends of the pipes are sealed with a gasket. Both of these type of prior art couplers utilizes a surface destructive action which disrupts the integrity of the pipe and can weaken the pipe by increasing the stress forces on the pipe or reducing the thickness of the pipe which creates weaker areas in the pipe that could fail. One mode of the present invention provides an improved universal pipe coupler and method of forming pipes into an end-to-end sealing relationship without disrupting the integrity of the pipe.

While preventing disruption of the integrity of the pipes is important for certain pipes, there are other instances where the internal fluid pressure of the coupled pipes and the materials of the coupled pipes are more significant factors. For example, in certain cases high pressure pipe couplers are needed to withstand internal pipe pressures in excess of 1000 p.s.i. In still other applications pipe couplers are needed to couple pipes that encounter only a few p.s.i. The present invention provides a universal pipe coupler suitable for use with either high or low pipe pressures as well as intermediate pipe pressures. In one embodiment of the invention the universal coupler aligns the pipes in an end-to-end relationship while being retained by a collar suitable to the required connection conditions.

For example, if the internal pipe pressures are high one can use a collar that is fixedly secured to the exterior of a pipe. If the internal pipe pressures are low one can use a resilient collar for compressively engaging a pipe to frictionally hold the pipes in a coupled condition. If the pipe pressures are in an intermediate range a third collar having teeth thereon, which are normally in non-engagement with the exterior pipe surface until the coupler is engaged can be used. In the latter embodiment the universal pipe coupler causes the collar with teeth to bitingly engages the pipe to thereby enable the pipe coupler to withstand high internal pressures. Thus, knowing the operating pressure range of the pipes allows one to use the universal coupler in combination with an appropriate pipe collar to provide an end-to-end sealing relationship for any of number or different pressure conditions without having to use a specialized pipe coupler.

Another difficulty encountered in coupling pipes is that often times pipes made from different materials need to be coupled together. For example, a plastic PVC pipe or polyethylene pipe oftentimes needs to be couple to a metal pipe. Generally, special couplers are required for coupling pipes made from different materials. The present invention provides a universal pipe coupler for use in coupling pipes made from different materials by allowing a user to couple pipes of different materials by selecting an appropriate retaining collars for each of the coupled pipes.

A further difficulty with coupling pipes in an end-to-end relationship is that the sometimes the pipes become misaligned making the coupling prone to leakage. In the present embodiment the universal coupler includes two alignment surfaces on each coupling member for one pipe and two different alignment surfaces on the same coupling member for the second pipe with each of the alignment surfaces in alignment with each other to thereby ensure that when the two pipe ends are secured therein the pipes are in alignment with each other.

Thus the universal coupler of the present invention allows a user to couple pipes of different materials as well as pipes that support low, intermediate or high pressure fluids.

DESCRIPTION OF THE PRIOR ART

U.S. Pat. No. 4,611,839 shows a segmented pipe coupling member that includes inclined end faces.

U.S. Pat. No. 4,461,498 shows a coupling member that uses either a grooved pipe or a member that bites into the exterior surface of the pipe.

U.S. Pat. No. 4,838,582 shows a flexible expansion coupling with an annular sealing member.

U.S. Pat. No. 4,552,434 discloses a multiple keyed pipe coupling that includes grooves in the exterior surface of the pipe.

U.S. Pat. No. 5,813,705 discloses snap action pipe coupler that uses a grove cut in the exterior surface of the pipe.

U.S. Pat. No. 5,578,900 discloses snap action pipe coupler that uses a groove cut in the exterior surface of the pipe.

U.S. Pat. No. 4,471,979 discloses a thin walled pipe with radial projection formed therein for engaging a coupling member.

U.S. Pat. No. 4,702,499 discloses a hinged pipe coupler that applies radial pressure to the pipe.

U.S. Pat. No. 4,886,304 discloses a coupling member with wedging members for engaging the pipe.

U.S. Pat. No. 5,476,292 shows a pipe coupling with compression member for gripping the exterior of the pipe.

U.S. Pat. No. 4,561,678 shows a pipe coupling segment that fits into a circumferential groove on the each of the pipes.

SUMMARY OF THE INVENTION

Briefly, the invention comprises a method of connecting pipes in a fluid-tight end-to-end relationship and a universal pipe coupler that in one embodiment includes a non-disruptive pipe collar that maintains the integrity of the pipe ends as the coupler simultaneously aligns the pipe ends and draws the pipe ends into a sealing relationship with a circumferential seal that provides a fluid-tight pressure seal around the pipe ends and in other embodiments maintains the pipes in an end-to-end sealing relationship with either frictional collars, contractable collars or both.

BRIEF DESCRIPTION OF THE DRAWINGS

FIG. 2 is a top view of a coupler joined to two pipes;

FIG. 3 is a sectional view taken along the lines 3—3 of FIG. 2;

FIG. 4D is a cross sectional view of a sealing member with the blow-out stop of FIG. 4A;

FIG. 5 is a partial cross sectional view of the annular sealing member revealing the position of the blow-out stop of FIG. 4 in the sealing member;

FIG. 6 is a cross sectional view taken along lines 6—6 of FIG. 5;

FIG. 7 is a coupler collar alignment guide for accurately positioning the annular retaining collar on a pipe to be joined to another pipe;

FIG. 8 shows the coupler collar alignment guide of FIG. 7 mounted on a pipe which is shown partially in cross section;

FIG. 9 is an end view of a pipe showing three coupler collar alignment guides mounted on the end of a pipe to hold the annular retaining collar with a series of weldments made to the annular collar and the pipe to hold the annular collar in position;

DESCRIPTION OF THE PREFERRED EMBODIMENT

Figure 1:
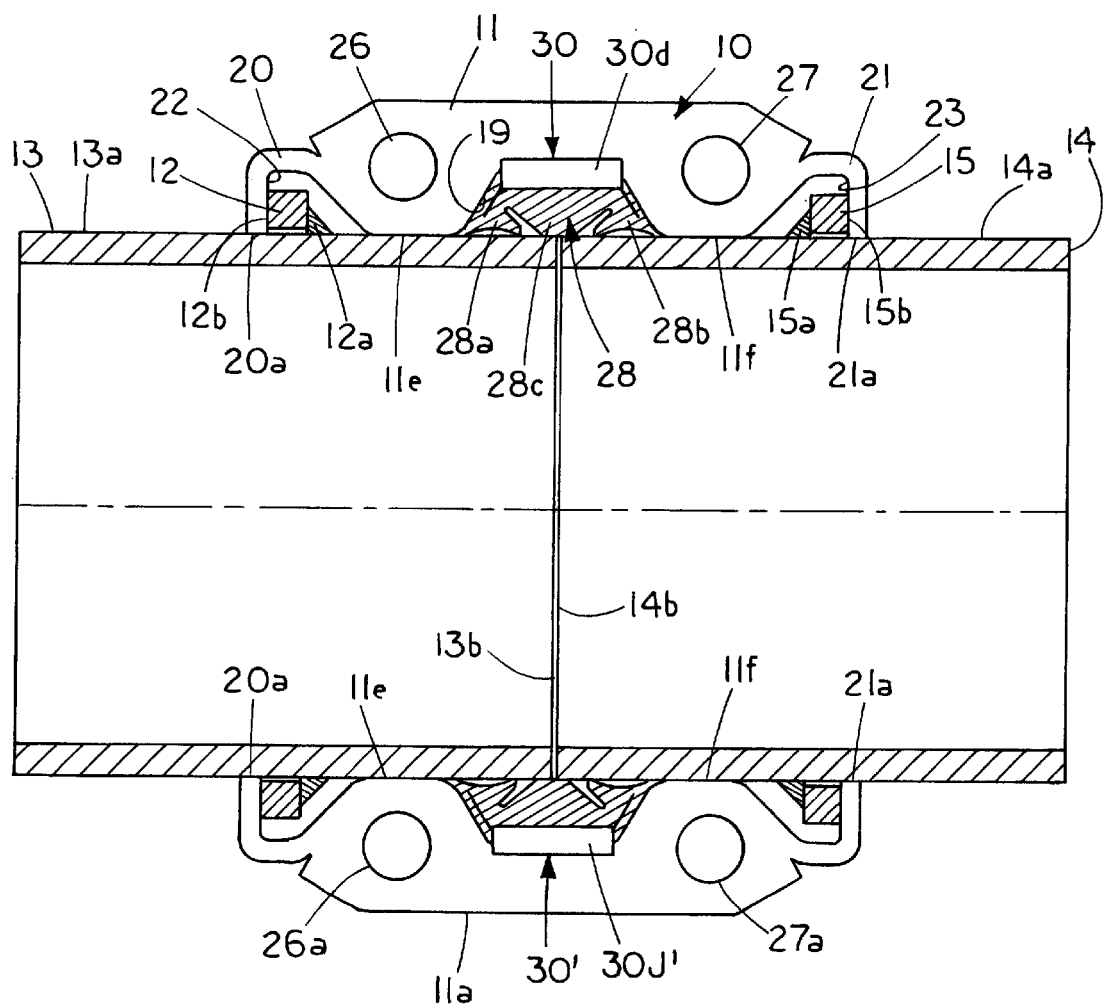
FIG. 1 shows a sectional view of two pipes and one part of a two piece universal coupler positioned over a sealing member having sealing legs in a splayed condition and retaining collars fixedly secured to each of the pipes.

Referring to FIG. 1 reference numeral 10 identifies a coupling member of a two piece universal pipe coupler which is partially positioned on a pipe 13 and partially positioned on a pipe 14 which is to be joined to pipe 13 in a fluid-tight sealing arrangement pipe 13 has an exterior surface 13a and a joinable end 13b which is positioned in an end-to-end relationship with a joinable end 14b of second pipe 14. Similarly, pipe 14 has an exterior surface 14a and a joinable end 14b which is positioned in an end-to-end relationship with the joinable end 13b of pipe 13.

Extending around the periphery of pipes 13 and 14 is a resilient annular sealing member 28 having annular triangular shaped legs 28a and 28b, which are shown in a splayed or unsealed condition on either side of a central annular seal 28c that extends onto ends of both pipe 13 and 14. Annular sealing member 28 is confined within a trough 19 that extends along the interior of coupling member 10. Annular sealing member 28 is made from a resilient material such as rubber and is compressible to form a fluid-tight seal over the joinable pipe ends 13a and 14a.

Extending radially outward from annular sealing member 28 is a first blow-out stop 30 and a second blow-out stop 30'. Blow-out stops 30 and 30' have a general U-shape with an extension projecting radially outward.

Figure 4:
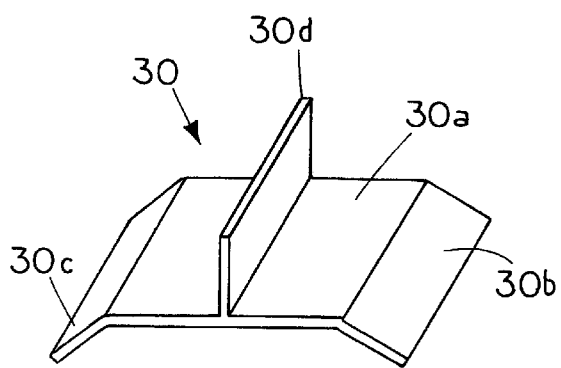
FIG. 4 is a perspective view of a blow-out stop.

FIG. 4 shows a more detailed view of a blow-out stop 30 having a generally U-shape with a first surface 30a and two side surfaces 30c and 30b. Extending perpendicularly upward from blow-out stop 30 is a mechanical alignment guide 30d that permits the blow-out stops to be positioned at the junction of two coupling members to each other. FIG. 1 shows that the blow-out stops 30 and 30' are located diagonally opposite of each other in sealing member 28 and with blow-out stop 30 alignment guide 30d positioned proximate bolt pad 11 and blow-out stop 30' alignment guide 30d' positioned proximate bolt pad 11a.

Figure 4A:
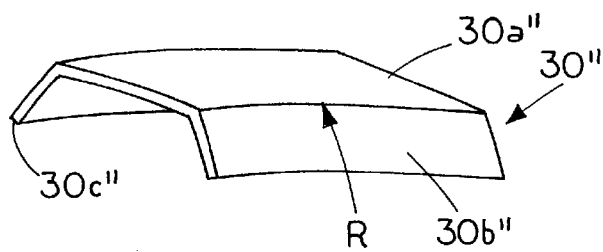
FIG. 4A is a perspective view of an alternate embodiment of a blow-out stop.
Figure 4B:
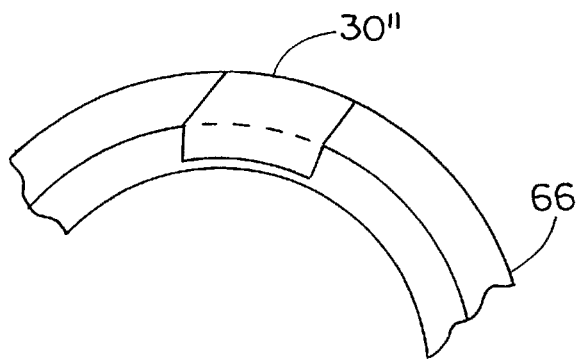
FIG. 4B is a partial perspective view of blow-out stop of FIG. 4A in an annular seal.

FIG. 4A shows an alternated preferred embodiment of a blow-out stop 30" having a generally U-shape with a first curved surface 30a" having a radius of curvature R substantially the same as a radius of curvature of a sealing ring 66 (FIG. 4B). Blow-out stop 30" includes two side surfaces 30c" and 30b" that extends partially along the side of sealing ring 66'. Blow-out stop 30" is similar to blow-out stop 30 but lacks the mechanical alignment guide 30d.

FIG. 4B is a partial perspective view of blow out stop 30" showing the blow out stop 30" circumferentially positioned on the exterior of an annular seal 66. Annular seal 66 differs from annular seal 28 in the use of alternate blow-out stop 30". In the embodiment shown in FIG. 4B the user visually aligns blow-out stop 30" with the junction of the coupling members. As an identical blow-out stop 30"' is located diagonally opposite of blow-out stop 30" the positioning of one blow-out stop automatically positions the other blow-out stop in correct position.

Figure 4C:
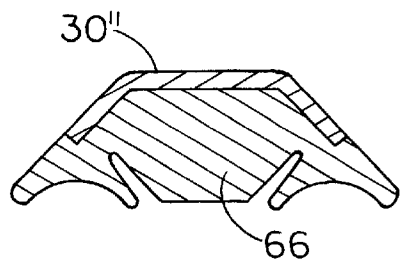
FIG. 4C is a cross sectional view of a sealing member with the blow out stop of FIG. 4A.

FIG. 4C shows a cross-sectional view showing blow-out stop 30" and annular seal 66 revealing the blow-out stop 30" embedded along the exterior surface of annular seal 66 in both the lateral and radial direction with the exterior surface of blow-out stop 30" being coextensive with the exterior surface of seal 66.

FIG. 4D is shows a cross-sectional view of blow out stop 30" and blow-out stop 30"' located diagonally opposite of each other on annular seal 66. Annular seal 66 is similar to annular seal 28 and includes central sealing member 66c and legs 66a and 66b.

Referring to FIG. 5 and FIG. 6, FIG. 5 shows a partial cut away view of annular sealing member 28 showing the diagonal positioning of blow-out stop 30 and 30' within annular sealing member 28.

Figure 1A:
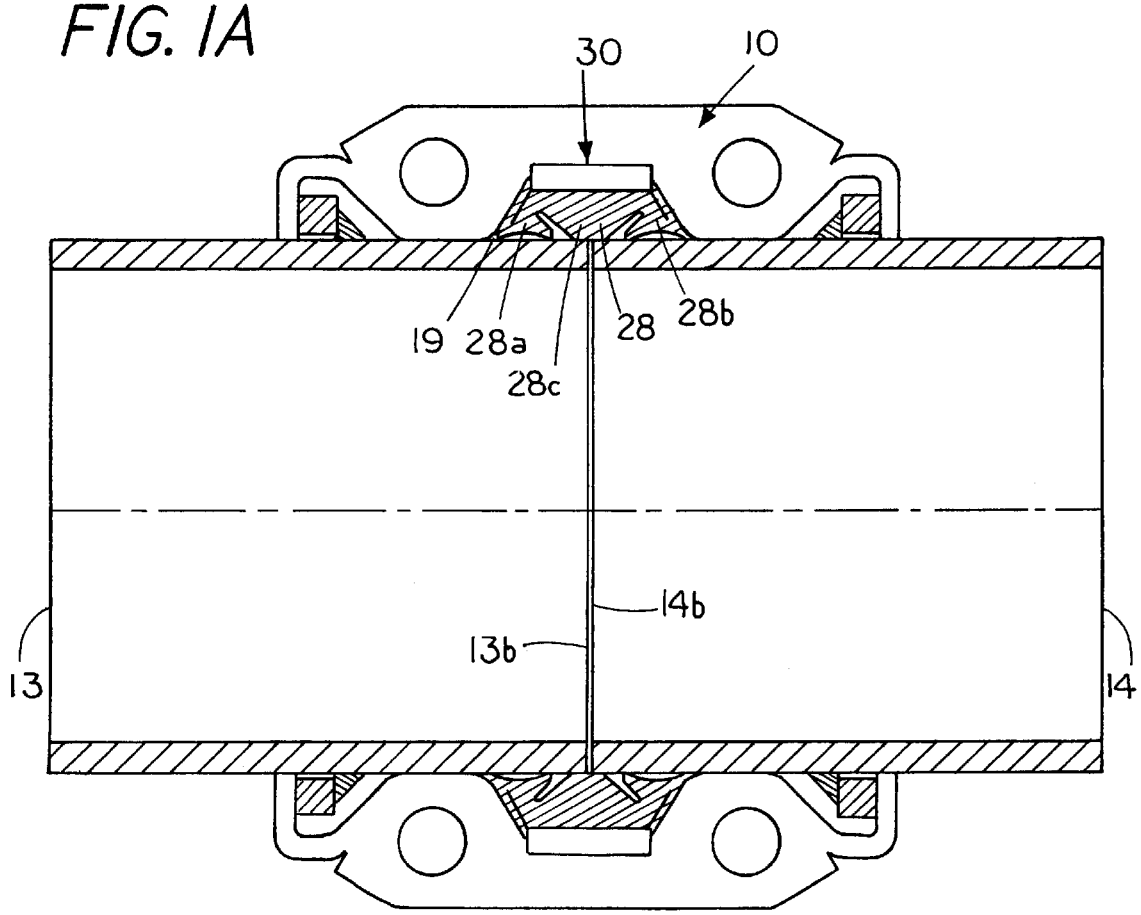
FIG. 1A shows the sectional view of FIG. 1 with the coupler brought against the pipe to place the sealing member in a sealing position.

FIG. 6 shows a cross sectional view showing the alignment guides 30d and 30d' extending radially outward from the sealing member. The triangular sealing legs 28a and 28b are shown in a splayed condition from the center seal 28c. The annular sealing legs 28a and 28b are shown with a concave bottom region with the circumferential edges of the triangular sealing legs projecting radially inward beyond the center seal 28c. In the compressed condition the circumferential edges of legs 28a and 28b will be brought tightly against exterior surfaces of different pipes while the center seal will encompass the gap between the joinable ends of two pipes and will compressively seal the two pipes to each other in cooperation with sealing legs 28a and 28b to produce a fluid tight seal as illustrated in FIG. 1A.

The blow-out stops are made of a rigid material such as metal and are intended to extend circumferentially across the unsupported area between coupling members. A reference to FIG. 3 shows the unsupported area, is the area where neither coupling member 10 or coupling member 10' support the annular seal 28. The unsupported area has a width designated by "s". The reason that their is an unsupported area is that the coupling members are circumferentially slightly less than a full semi-circle so that if each of the coupling members are joined to each other the internal opening would not form a perfect circle. By placing the blow-out stops such that alignment guide 30 and alignment guide 30' extend across the gap the blow-out stop is centrally positioned so as to provide radial support for annular seal 28 when the annular seal is under pressure thereby providing a substantial increase in the ability of the coupler annular seal 28 to withstand high pressure.

FIG. 3 shows coupling member 10 extends about half way around the periphery of pipes 13 and 14 and an identical coupling member 10' also extends about half way around periphery of pipe 13 and 14 to mate with coupling member 10 but to leave the aforementioned gap indicated by "s". FIG. 1 and FIG. 3 shows the coupling member 10 includes a flange or bolt pad 11 on one end and a flange or bolt pad 11a on the opposite end so that the coupling member 10 can be joined to an identical coupling member 10' to provide a coupler for holding two pipes in a fluid-tight sealing condition with the pipes positioned in an end-to-end relationship. Extending through flange 11 are bolt holes 26 and 27. Similarly, extending through flange 11a are bolt holes 26a and 27a. FIG. 3 shows bolts 50 and 52 therein.

Referring to FIG. 1, located on the interior of coupling member 10 are two sets of semi-cylindrical pipe alignment surfaces, a first set for one pipe and a second set for the other pipe each of which are located in coaxial alignment with each other. The first set comprises a first circular pipe alignment surface 11f and a second circular pipe alignment surface 21a each of which have a radius of curvature of substantially the same radius of curvature of the exterior of the pipes to be joined. The second set comprises a first circular pipe alignment surface 11e and a second circular pipe alignment surface 20a each of which also have a radius of curvature of substantially the same radius of curvature of the exterior of the pipes. As each of the alignment surfaces are positioned in coaxial alignment with each other the pipes will be held in coaxial alignment. For example, a pipe 14 which is engaged by two alignment surfaces 21a and 11f ensures that pipe 14 is maintained with a first axis and pipe 13, which is engaged by two alignment surface 11e and 20a ensure that pipe 13 will be maintained in a second axis and since all the alignment surfaces are in coaxial alignment with each other it follows that the pipes 13 and 14 will be maintained in coaxial alignment with each other. Thus, in the sealing condition (when two coupling members are brought together as illustrated in FIG. 3) pipe alignment surface 11e and 20a engage pipe surface 13a and similarly pipe alignment surface 11f and 21a engage pipe surface 14a to hold pipes 13 and 14 in coaxial alignment with each other.

Located on exterior surface 14a of pipe 14 is an annular rigid collar 15 which is secured to pipe 14 by a weldment 15a. The weldment 15a is positioned on the side of collar 15 which faces the joinable end 14b of pipe 14. Similarly, located on exterior surface 13a is an annular rigid collar 12 which is secured to pipe 13 by a weldment 12a which faces the joinable end 13b of pipe 13. While collar 12 and collar 15 are secured to the exterior of the pipe they do not provide surface destructive engagement on the pipe. That is, the weldment of collar 12 or 15 can actually add to the strength of the pipe but do not weaken the pipe as occurs by forming an annular groove in the pipe or causing teeth to penetrate into the pipe. Thus even thin walled pipes can be coupled with the present invention and in some cases can be reinforced by the collars 12 and 15.

FIG. 1 shows the coupling member 10 in a preconnected condition prior to bringing the pipes 13 and 14 into an end-to-end coupling and sealing arrangement. In the condition shown in FIG. 1 the annular sealing member 28 is shown in relaxed condition within trough 19b of coupling member 10. In the relaxed condition the triangular shaped annular legs 28a and 28b are shown in a splayed condition away from the central annular seal 28c.

Referring to FIG. 1A, which is identical to FIG. 1 except the coupling member 10 is illustrated in a connected condition i.e. with the sealing member 28 being compressively squeezed within annular trough 19 so that the splayed legs 28a and 28b are brought into squeezed engagement with central annular seal 28c. In this condition the pipe end 13b and 14b are sealed so that fluids or particles cannot escape from the ends of pipes 13 and 14. It should be understood that in the connected condition two coupling members 10 and 10'' (FIG. 3) each extending slightly less than half way around the pipes are brought toward each other by bolts extending through bolt pads 11 and 11a. (FIG. 3) However, as the coupling members each extend only slightly less than half way around the pipes a gap, which is indicated by "s" in FIG. 3 separates the bolt pads of the two coupling members. Under high pressure conditions the gap creates an unsupported region on annular seal 28. By placing the blow-out stops in the annular sealing member 28 so that the blow-stops extend across the gaps allows the handling of high pressure fluids without fear of rupture of sealing member 28.

FIG. 1 shows that coupling member 10 includes a first semi-circumferential leg 20 that extends in an axial direction outward over collar 12 with leg 20 having a collar engaging surface 22 for engaging face 12b of collar 12. Similarly, coupling member 10 includes a second semi-circumferential leg 21 that extends in an axial direction outward over collar 15 with leg 21 having a collar engaging surface 23 for engaging face 15b of collar 15. In the position shown in FIG. 1 the collar engaging surface 22 of leg 20 engages collar surface 12b and the collar engaging surface 23 of leg 20 engage the face of collar surface 15b to hold the pipes 13 and 14 in an end-to-end condition. That is, the pipes 13 and 14 may have a slight gap as shown but each of the pipes 13 and 14 are prevented from axial separation from each other by the legs 20 and 21 which respectively engage collars 12 and 15 that are rigidly secured to the pipes 13 and 14. As coupling member 10 is a rigid body with legs 20 and 21 positioned in a fixed position it is apparent the universal coupler shown in FIG. 1 uses a pair of coupling member 10 and 10' (FIG. 3) holds the pipes 13 and 14 in an end-to-end relationship with retaining collars 12 and 15 that do not disrupt the integrity of the pipes as it does not require retaining collars 12 and 15 to form either biting engagement of pipes 13 and 14 or an annular recess in each of the pipes.

To illustrate the method of attachment of collar 15 reference should be made to FIG. 9 which shows three collar alignment guides 70, 70' and 70" positioned around the end of pipe 14. Each of the collar alignment guides hold collar 15 in a spaced position from joinable end of pipe 14. While the collar 15 is held in position by the alignment guides 70, 70' and 70" the weldments 15a can be secured to collar 15 and to pipe 14 to form collar 15 into an axial stop. If pipe 15 is metal the weldments could be welded thereon through a welding procedure using gas or arc welding or the like.

Welding can occur partially around the exterior of the pipes or completely around the periphery of the pipes. If desired a suitable adhesive could be used to secure collar 15 in position. Similarly, if the pipes are plastic the collar 15 could be secured by an adhesive weldment. Thus it will be understood the method of securement of the collar to the pipe can involve different techniques depending on the type of material in the pipe and the conditions the pipe will need to withstand. It should be pointed out that if weldments are used that protrude outward the weldments can be placed proximate the joinable end of the pipe so as not to interfere with the legs of the coupling member engaging the collar.

Thus with the present invention, an end-to-end coupling can be made that does not reduce the strength of the pipe as occurs when a groove is cut in the pipe. Similarly, the localized compressive biting pressure on the pipe from teeth that bitingly engage the exterior of the pipe to hold a pair of pipes in an end-to-end relationship is reduced since the pressure applied by coupler 10 is distributed evenly around pipes 13 and 14, which have not been disrupted.

Thus in one aspect the invention comprises a first coupling member 10 having a first circumferential pipe alignment surface 11e and a second circumferential pipe alignment surface thereon 11f and a first collar engaging leg 20 and a second collar engaging leg 22 for maintaining an axial position, with a sealing trough 19 therein. Positioned next to coupling member is coupling member 10″ also having an identical first circumferential pipe alignment surface, an identical second circumferential pipe alignment surface, an identical first collar engaging leg and an identical second collar engaging leg for maintaining the axial position and an identical sealing trough. Located within the sealing trough is resilient annular seal 28 having a relaxed condition wherein the annular seal is larger than a recess formed by the sealing trough so that when the first and second coupling member 10, 10' are drawn together the annular seal is squeezed into a fluid-tight seal around the joinable end 13b of first pipe 13 and the joinable end 14b of second pipe 14 to thereby provide a fluid-tight seal therearound while the coupling members 10, 10' coacting to maintain the axial position.

FIGS. 7 and 8 show the coupler collar alignment guide 70 includes a first member 71 and a second member 72 with member 71 resiliently connected to second member 72 so that said member 72 and member 71 normally tend to close toward one another to resiliently hold member 72 and member 71 proximate a pipe surface 14a. The coupler collar alignment guide also includes a collar alignment recess 79 located on coupler collar alignment guide 70 so that said coupler collar alignment guide 70 can maintain a collar 15 a fixed distance from an end 14b of a pipe 14.

Referring to FIGS. 7–9 and FIG. 1 the method of joining a first pipe to a second pipe in an end-to-end relationship comprises the steps of 1. placing a first collar 12 a fixed distance proximate a joinable end of the first pipe; 2. placing a second collar 15 a fixed distance proximate a joinable end of the second pipe 3. placing a resilient annular seal 28 over the joinable end of the first pipe and the joinable end of the second pipe 4. placing a first coupling member 10 around the first pipe and the resilient annular seal 28; 5. placing a second coupling member 10' around the second pipe 14 and the resilient annular seal 28 and over the second collar 15 and the first collar 12; and 6. compressively squeezing the first coupling member 10 toward the second coupling member 10' to force the resilient annular seal 28 into a fluid-tight seal around the joinable ends 13b, 14b while the first and second coupling members 10, 10' force the first pipe 13 and second pipe 14 into coaxial alignment with each other.

Figure 10:
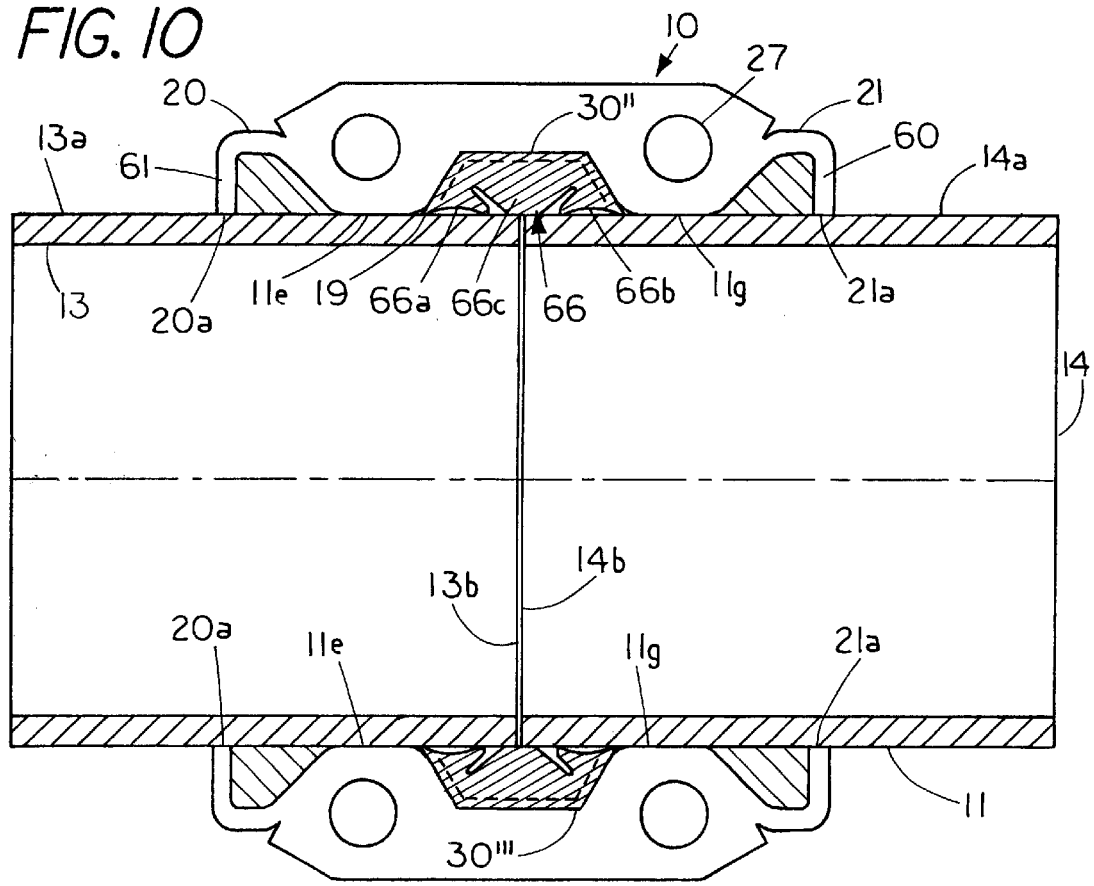
FIG. 10 shows a sectional view of an alternative embodiment of a two piece coupler positioned over a sealing member in a sealing position.
Figure 11:
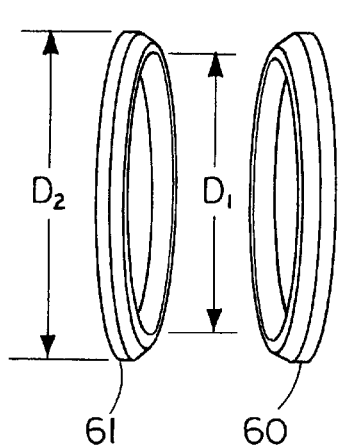
FIG. 11 shows a perspective view of resilient annular retaining collars for use in the coupler of FIG. 10.

Referring to FIG. 10 reference numeral 10 identifies an alternate embodiment of a two piece universal coupler suitable for low pressure coupling with coupler 10 engaging a first resilient gripping retaining collar or ring 60 and a second resiliently gripping retaining collar or ring 61 instead of rigid retaining collars. Coupler number 10 is partially positioned on a pipe 13 and partially positioned on a pipe 14 which is to be joined to pipe 13 in a fluid-tight sealing arrangement. Coupler 10 shown in FIG. 1 uses rigid collars 12 and 15 on pipes 13 and 14 while coupler 10 shown in FIG. 10 uses resilient, frictional, gripping collars 60 and 61 that are compressively squeezed to frictionally engage the ends of the pipe to laterally restrain the pipes from axially separating from each other FIG. 11 shows a pair of identical frictional, resilient, frictional gripping rings or collars 60 and 61. Gripping collar 61 has an internal diameter $D_1$ which is about the same or slightly smaller than the external diameter of piper 13 or 14 so that gripping collar 61 frictional engages the exterior of pipe 13. Similarly, gripping collar 60 has an internal diameter $D_1$ which is about the same or slightly smaller than the external diameter of pipe 13 or 14 so that gripping collar 60 frictional engages the exterior of pipe 14. The outside diameter $D_2$ of gripping collar 61 is larger than the recess formed between extension leg 20 and the exterior surface of pipe 13 so that when coupler 70 and its counterpart are squeezed around the ends of pipe 13 the gripping collar 61 is squeezed and brought into frictional engagement with pipe 13 thereby preventing lateral movement along pipe 13.

Figure 12:
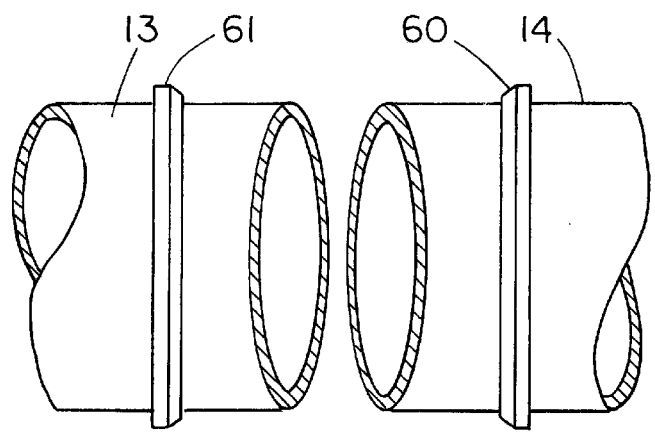
FIG. 12 shows the resilient annular retaining collars of FIG. 11 wrapped around two pipes.

FIG. 12 shows the positioning of annular gripping collar 60 and 61 on the respective pipes 14 and 13. In order to properly space the annular gripping collars 60 and 61 one can use the alignment guide shown in FIGS. 7 and 8. In this embodiment the gripping collars 60 and 61 need not be secured to pipes 13 and 14 since the frictional forces between the rings and the surface of the pipe are used to anchor the coupler to the pipes.

Referring to FIG. 12, is a first annular resilient gripping collar 60 has been placed around pipe 14 by sliding collar 60 along pipe 14 before coupler 11 is connected thereto. Gripping collar 60 has an external shape that closes matches the internal shape of the annular trough 23 formed between axial leg 21 and exterior surface of pipe 14. The purpose of having a mating shape between the annular trough 23 and the gripping collar 60 is to ensure that the gripping collar 60 can be brought into high frictional engagement with pipe 14 by compression of gripping collar 60 against pipe 14. Similarly, located on exterior surface 13a is an annular resilient gripping collar 61 which is secured to pipe 13 by placing collar 61 over pipe 13 before coupler 11a is placed on pipe 13. Similarly, gripping collar 61 has an external shape that closes matches the internal shape of the annular trough 22 formed between axial leg 20 and exterior surface of pipe 13. Gripping collars 60 and 61 are made from a resilient material having frictional characteristics such as rubber or the like. In the present invention a gripping collar made of a material such as rubber provides lateral frictional resistance to displacement to assist in holding coupler 70 on pipes 13 and 14.

Referring to FIG. 10 coupling member 10 is shown in a connected condition with the sealing member 66 being compressively squeezed within annular trough 19 so that the splayed legs 66a and 66b are brought into squeezed engagement with central annular seal 66c to prevent leakage therepast. In this condition the pipe end 13b and 14b are sealed so that fluids or particles cannot escape from the ends of pipes 13 and 14. It should be understood that in the connected condition two coupling members each extend about half way around the pipes are brought toward each other by bolts extending through bolt pads 11 and 11a.

Located in annular sealing member 66 is a first blow-out stop 30" and a second blow-out stop 30'". While the blow-out stops 30" and 30'" are shown in conjunction with low pressure coupler 10 of FIG. 10, in certain conditions the blow-out stops may not be necessary as the pressure internal to the pipes is insufficient to rupture an unsupported sealing member.

In operation of coupler 10 of FIG. 10 the engagement of the pipes with the coupling members is identical to the engagement of coupler 10 shown in FIG. 1. That is, a mating coupler (not shown) is brought toward coupler 10 by bolts extending through the bolt openings located in the flanges of pipe coupler 10. Bringing the couplers toward each other compressively squeezes annular sealing member 66 to provide a fluid-tight seal. In addition the pipes 13 and 14 are brought into axial end alignment by the cylindrical alignment surfaces 11e, 11f, 20a and 21a on coupler 10. In order to provide axial restraint of pipe 13 with respect to pipe 14 the gripping collars 60 and 61 are compressively squeezed. That is extension leg 21 compressively squeezes gripping collar 60 against the exterior surface of pipe 14 and extension leg 20 compressively squeezes gripping collar 61 against the exterior surface of pipe 13. By use of frictional material such as rubber the radial squeezing produces a high lateral frictional engagement with pipes 13 and 14 thus resisting the separation of the pipes.

Thus in one aspect the process of connecting two pipes by use of couplers under low pressure is the same as the process for connecting two pipes by use of couplers 10 and 10' under high pressure in that bolts or the like are used to squeeze the couplers together.

Instead of using a rigid annular collar 12 and 15, such as shown in FIG. 1, which needs to be secured to the pipes, the embodiment of FIG. 10 uses frictional gripping collars 60 and 61. Once the couplings are joined together around the pipe and are tightened, the tightening action causes the annular resilient frictional gripping collars 60 and 61 to be compressively squeezed thereagainst to produce frictional resistance against lateral displacement along pipes 13 and 14.

Referring to FIGS. 10–12 the method of joining a first pipe to a second pipe in an end-to-end relationship with a low pressure seal comprises the steps of 1. placing a first resilient gripping collar 61 a fixed distance proximate a joinable end of the first pipe; 2. placing a second resilient gripping collar 60 a fixed distance proximate a joinable end of the second pipe 3. placing a resilient annular seal 66 over the joinable end of the first pipe and the joinable end of the second pipe 4. placing a first coupling member 10 around the first pipe 13 and the resilient annular seal 66; 5. placing a second coupling member around the second pipe 14 and the resilient annular seal 66 and over the second sealing collar 60 and the first sealing collar 61; and 6. compressively squeezing the first coupling member 10 towards the second coupling member to force the resilient annular seal 66 into a fluid-tight seal around the joinable ends 13b, 14b while the first and coupling members force the first pipe 13 and second pipe 14 into coaxial alignment with each other. The radial inward pressure of extension legs 20 and 21 compressively squeezes the resilient gripping rings 60 and 61 so as to create a high frictional resistance to axial displacement of pipe 14 with respect to pipe 13.

Figure 13:
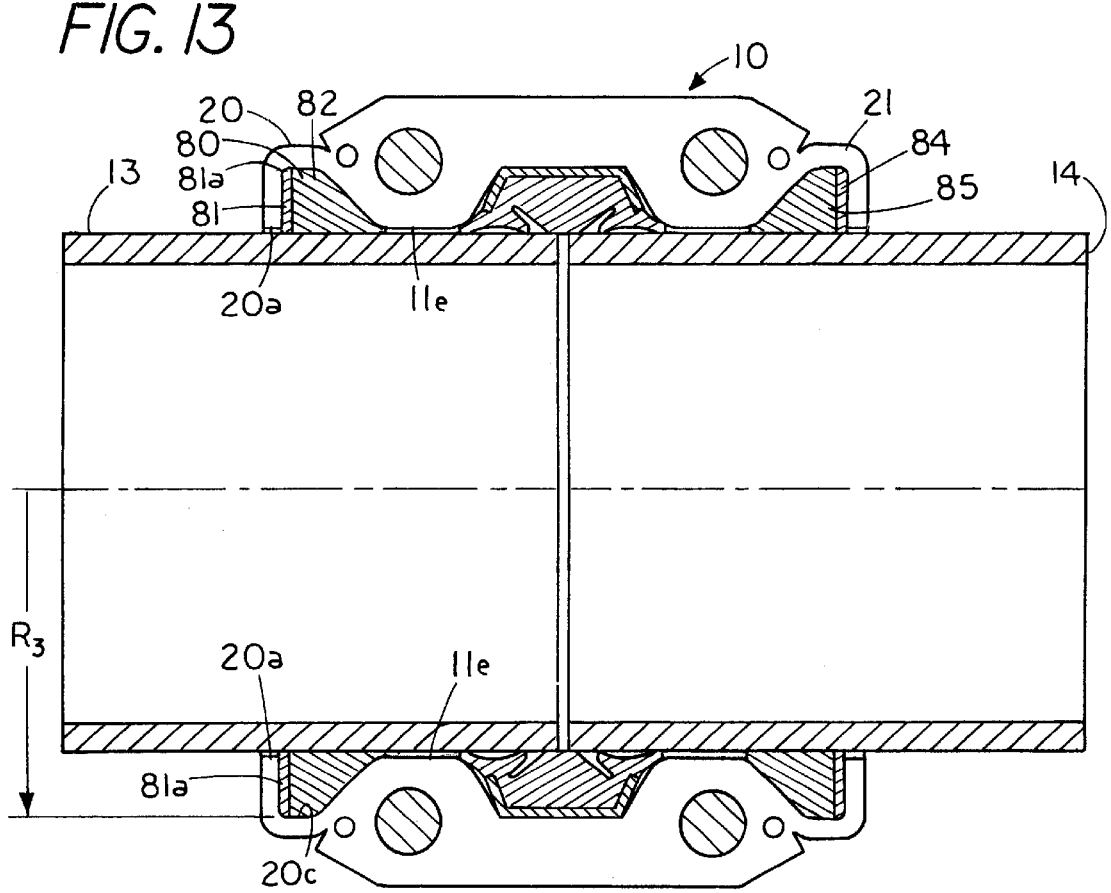
FIG. 13 shows a sectional view of two pipes and one part of a two piece universal coupler of FIG. 1 with contractable retaining collars supported by a resilient collar.
Figure 14:
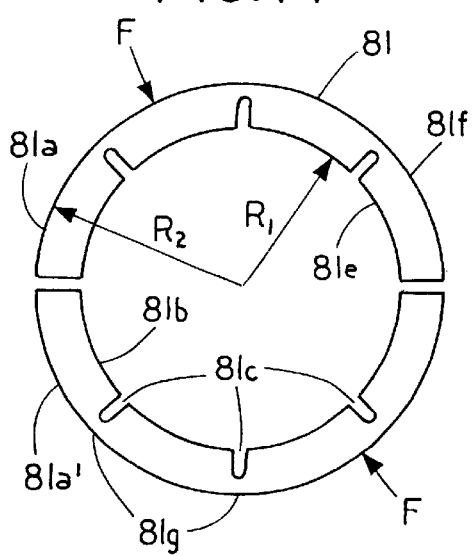
FIG. 14 shows a front view of the contractable retaining collar with no teeth.
Figure 15:
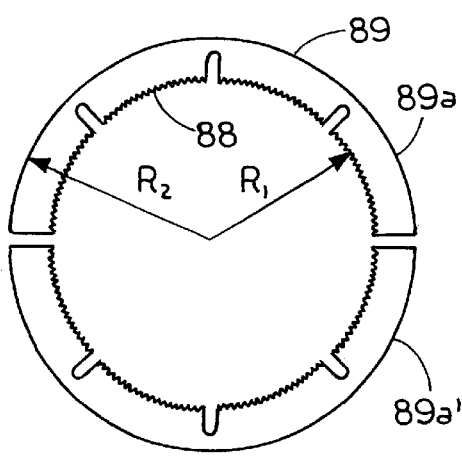
FIG. 15 shows a front view of the contractable retaining collar with radial teeth.

FIGS. 13 to 15 shows the coupling member 10 of the universal coupler with a two part retaining collar 80 comprised of a first semi-circular, radially contractible member 81 resiliently supported by a resilient collar 82 within the annular confines of semi-circumferential leg 20 and a second retaining collar 84 comprised of a first semi-circulaar, radially contractible member 84 resiliently supported by resilient collar 85 within the annular confines of semi-circumferential leg 21. The radius of the interior of leg 20 and 21 is identified by $R_3$. In the embodiment shown in FIG. 13 the retaining collar 81 is supported in a plane normal to pipe 13 with one face of retaining collar located against leg 20 and the other laterally supported by resilient member 82. This places the outer circumferential edge 81a in contact with the interior circumferential surface 20c of leg 20.

To understand the relationship of the collars which comprised radially contractable member 81 and 84 reference should be made to FIG. 14 which shows a front view of radially contractable member 81 comprises of a first semi-circular member 81a and 81a'. Each of the semicircular radially contractable members 81a and 81a' have radial reliefs 81c therein to permit radial contraction of member 81a and 81a' when the coupler is brought into engagement with a pipe. That is, elongated reliefs 81c formed in members 81a and 81a' creates arcuate sections that are supported therebetween by circumferential bridges 81g, which are weaker than the other portions of members 81a and 81a'. Consequently, an inward radial compressive force, as indicated by force arrows F, causes a radial inward deflection of the arcuate sections thereby causing the inside edge 81e to engage the exterior of the pipe. In the embodiment shown in FIG. 14 there is provide a circular untoothed interior surface 81b for radially engaging the exterior surface of a pipe. The radial distance $R_1$ is the distance from the center to the inside edge 81e and the radial distance $R_2$ is the distance from the center to the outside edge 81f. As the radial distance $R_3$ is decreased by tightening the flanges on coupler 10 the radial distance $R_1$ decreases causing the members 81a and 81a' to engage the exterior surface of a pipe and prevent lateral displacement This arrangement is partially suitable for plastic pipes made of materials such as polyethylene, PVC or the like since the inside edge compressively engages the outer surface of the pipe to maintain the pipe within the coupler.

While FIG. 14 shows a front view of the contractable retaining collar with no teeth, FIG. 15 shows a front view of the contractable retaining collar 89 having a first semi-circualr member 89a with radial teeth 88 and a second semi-circuaarl member 89a' with radial teeth 88. Radially contractable retaining collar 89 is identical to radially contracting collar 81 except for the presence of radial teeth 88 in radially contractable retaining collar 89. The use of teeth 88 permits the collar to be used with different materials and under different pressures. That is, the radial comparison of contractable retaining collar 89 causes the teeth 88 to bite into and engage the surface of the pipe. Contractable retaining collar 89 is especially suited for those pipe surfaces that might have a slippery exterior surface thereby making it well suited for use with plastic pipes.

Thus it can be envisioned that the coupler 10 can be used with the fixedly secured collar 12 shown in FIG. 1, or the frictional engageable collars such as the resiliently compressible collar 61 shown in FIG. 10, the radially contractable collar 81 shown in FIG. 14 or the radially contractable collar 89 shown in FIG. 15. By selecting the retaining collar according to the materials of the pipe or the operating pressure range one can use the universal coupler of the present invention under a variety of coupling conditions including different types of pipes as well as different pressure conditions.

I claim:

1. A non-surface destructive pipe coupler comprising:
   a first collar for securing to a joinable end of a first pipe without disrupting a cylindrical surface of the first pipe;
   a second collar for securing to a joinable end of a second pipe without disrupting a cylindrical surface of the second pipe;
   a first coupling member, said first coupling member having a pipe alignment surface thereon, said first coupling member having a collar engaging leg thereon, said first coupling member having a sealing trough therein;
   a second coupling member, said second coupling member having a pipe alignment surface thereon, said second coupling member having a collar engaging leg thereon, said second coupling member having a sealing trough therein, at least one of said coupling members extending circumferentially slightly less than half way around said first pipe and said second pipe to create a gap between the coupling members when the coupling members are in a coupled condition; and
   a resilient annular seal, said annular seal having a central seal and lateral legs on each side of said central seal, said annular seal larger than a recess formed by said sealing trough of said first coupling member and said second coupling member so that when said first and second coupling member are drawn together said annular seal is squeezed into a fluid-tight seal around the joinable end of said first pipe and the joinable end of said second pipe to thereby provide a fluid-tight seal therearound with said first collar engaging leg restrained from axial displacement by said first collar and said second collar engaging leg restrained from axial displacement by said second collar of said first member to thereby maintain said first pipe and said second pipe in axial position.

2. The coupler of claim 1 wherein the resilient annular seal includes at least one blow-out stop made of a rigid material extending circumferentially across the gap between the coupling members to provide a high pressure reinforcement of said resilient annular seal.

3. The coupler of claim 2 wherein the resilient annular seal and the lateral legs are generally triangular shaped.

4. The coupler of claim 3 wherein each of said coupling member pipe alignment surfaces have a radius of curvature substantially the same as a radius of curvature of the first pipe to be joined in end-to-end relationship with the second pipe.

5. The coupler of claim 4 including a flange on each of said coupling members.

6. The coupler of claim 5 wherein at least two bolts extend through each of said flanges on said coupling member.

7. The coupler of claim 1 wherein the first collar is frictional secured to the first pipe by compressively squeezing the first collar with said first collar engaging leg and the second collar is frictionally secured to the second pipe by compressively squeezing the second collar with said second collar engaging leg.

8. The coupler of claim 1 wherein the first collar is fixedly secured to the first pipe and the second collar is fixedly secured to the second pipe.

9. A method of joining a first pipe to a second pipe in an end-to-end relationship without disrupting the integrity of the pipe comprising:
   placing a first collar in a non-surface disruptive condition a fixed distance proximate a joinable end of the first pipe;
   placing a second collar in a non-surface disruptive condition a fixed distance proximate a joinable end of the second pipe;
   placing a resilient annular seal over the joinable end of the first pipe and the joinable end of the second pipe;
   placing a first coupling member around the first pipe, the second pipe and the resilient annular seal and over the second collar and the first collar with said first coupling member extending circumferentially around a portion of said pipes;
   placing a second coupling member around the first pipe, the second pipe and the resilient annular seal and over the second collar and the first collar with said second coupling member extending circumferentially around said pipes to create a gap between the coupling members when the coupling members are in a coupled condition; and
   compressively squeezing the first coupling member toward the second coupling member to force the resilient annular seal into a fluid-tight seal around the joinable ends while the first and second coupling members simultaneously force the first pipe and second pipe into coaxial alignment with each other.

10. The method of claim 9 including using a coupling collar alignment guide to position the first collar on the first pipe.

11. The method of claim 10 wherein at least three coupling collar alignment guides are used to position the first collar on the first pipe.

12. The method of claim 9 wherein the first collar and the second collar is welded to said first pipe.

13. The method of claim 9 when the first collar and the second collar are frictionally secured to said second pipe.

14. The method of claim 9 wherein a set of bolts are used to compressively squeeze the first coupling member toward the second coupling member.

15. A pipe coupler comprising:
   a first coupling member, said first coupling member having a first circumferential pipe alignment surface and a second circumferential pipe alignment surface, said first coupling member having a first collar engaging leg and a second collar engaging leg for maintaining an axial position of said first coupling member, said first coupling member having a sealing trough therein;
   a second coupling member, said second coupling member having a first circumferential pipe alignment surface and a second circumferential pipe alignment surface thereon, said pipe alignment surfaces of said first coupling member and said second coupling member having a radius of curvature substantially the same as a radius of curvature of the exterior of a set of pipes to be joined so that when said first coupling member and said second coupling member are brought together the set of pipes to be joined are brought into co-axial alignment with each other, said second coupling member having a first collar engaging leg and a second collar engaging leg for maintaining an axial position of said second coupling member, said second coupling member having a sealing trough therein; and
   a resilient annular seal, said resilient annular seal having a relaxed condition wherein the annular seal is larger than a recess formed by said sealing trough of said first coupling member and said sealing trough of said second coupling member so that when said first and second coupling member are drawn together the resilient annular seal is squeezed into a fluid-tight seal while said collar engaging legs maintain the axial position of said first coupling member and said second coupling member.

16. The pipe coupler of claim 15 including a first collar for frictional engaging a first pipe in a non-destructive manner and a second collar for frictional engaging a second pipe in a non-surface destructive manner.

17. A universal pipe coupler comprising:

a first coupling member, said first coupling member having a first circumferential pipe alignment surface, said first coupling member having a first collar engaging leg, said first coupling member having a second circumferential pipe alignment surface thereon, said first coupling member having a second collar engaging leg, said second collar engaging leg forming a retaining collar trough therein;

a second coupling member, said second coupling member having a first circumferential pipe alignment surface, said first coupling member having a first collar engaging leg, said second coupling member having a second circumferential pipe alignment surface with said first coupling member and said second coupling member each having a geometric central axis located in co-axial alignment with each other, said second coupling member having a second collar engaging leg, said second collar engaging leg forming a retaining collar trough;

a first retaining collar, said first retaining collar securable to a first pipe through frictional engagement imparted to said first retaining collar by radially displacement of said first collar engaging leg of said first coupling member and said second coupling member;

a second retaining collar, said second retaining collar securable to a second pipe through frictional engagement imparted to said second retaining collar by radially displacement of said second collar engaging leg so that said first coupling member and said second coupling member can hold the first pipe and the second pipe in an end-to-end aligned relationship; and a circumferential seal for extending around a junction of said first pipe and said second pipe to prevent leakage of fluid therepast.

18. The universal pipe coupler of claim 17 wherein said first retaining collar includes teeth.

19. The universal pipe coupler of claim 17 wherein said first retaining collar is different from said second retaining collar.

20. The universal pipe coupler of claim 17 wherein said first pipe is a metal pipe and said second pipe is a polymer plastic.

21. The universal pipe coupler of claim 17 wherein said first retaining collar includes deformable circumferential bridges to provide for radial contraction of said first retaining collar in response to a radial force.

22. The universal pipe coupler of claim 17 wherein said first retaining collar includes an inside circumferential edge having radially extending teeth therein.

23. The universal pipe coupler of claim 22 including a resilient member holding said first retaining collar in a radial contractable position in said trough in said first leg.

24. The universal pipe coupler of claim 17 wherein said first retaining collar comprises two substantially semi-circular sections.

25. The universal pipe coupler of claim 17 wherein the second circumferential alignment surface of said first coupling member is located on said second collar engaging leg.

26. The method of claim 9 wherein the step of placing a second coupling member around the first pipe, the second pipe and the resilient annular seal and over the second collar and the first collar comprises placing a second coupling member around the first pipe, the second pipe and the resilient annular seal and over the second collar and the first collar with said second coupling member extending circumferentially slightly less than half way around said pipes to create a gap between the coupling members when the coupling members are in a coupled condition.

* * * * *